(12) United States Patent
Li

(10) Patent No.: US 8,150,129 B2
(45) Date of Patent: Apr. 3, 2012

(54) IMAGE DIAGNOSIS SUPPORTING APPARATUS, METHOD AND PROGRAM, AND RECORDING MEDIUM THEREOF

(75) Inventor: Yuanzhong Li, Minato-ku (JP)

(73) Assignee: Fujifilm Corporation, Tokyo (JP)

( * ) Notice: Subject to any disclaimer, the term of this patent is extended or adjusted under 35 U.S.C. 154(b) by 961 days.

(21) Appl. No.: 12/139,742

(22) Filed: Jun. 16, 2008

(65) Prior Publication Data

US 2009/0003676 A1 Jan. 1, 2009

(30) Foreign Application Priority Data

Jun. 19, 2007 (JP) ................................. 2007-161224

(51) Int. Cl.
*G06K 9/46* (2006.01)
(52) U.S. Cl. ......... 382/131; 382/128; 382/190; 382/195
(58) Field of Classification Search .................. 382/128, 382/131, 132, 181, 190, 195, 199, 206
See application file for complete search history.

(56) References Cited

U.S. PATENT DOCUMENTS

| | | | | | |
|---|---|---|---|---|---|
| 5,570,404 | A | * | 10/1996 | Liang et al. ...................... | 378/8 |
| 6,526,117 | B1 | * | 2/2003 | Okerlund et al. ................. | 378/8 |
| 6,956,926 | B2 | * | 10/2005 | Cesmeli et al. ................... | 378/8 |
| 7,088,850 | B2 | * | 8/2006 | Wei et al. ....................... | 382/128 |
| 7,218,766 | B2 | * | 5/2007 | Eberhard et al. .............. | 382/132 |
| 7,346,199 | B2 | * | 3/2008 | Pfaff ............................. | 382/128 |
| 7,596,267 | B2 | * | 9/2009 | Accomazzi et al. ........... | 382/173 |
| 7,646,902 | B2 | * | 1/2010 | Chan et al. ..................... | 382/128 |
| 7,693,254 | B2 | * | 4/2010 | Muller et al. .................... | 378/37 |
| 7,786,990 | B2 | * | 8/2010 | Wegenkittl et al. ........... | 345/419 |
| 7,840,047 | B2 | * | 11/2010 | Boing et al. ................... | 382/128 |
| 7,929,743 | B2 | * | 4/2011 | Khorasani ..................... | 382/128 |
| 7,929,793 | B2 | * | 4/2011 | Gering et al. .................. | 382/239 |
| 7,936,922 | B2 | * | 5/2011 | Berger .......................... | 382/173 |
| 2006/0050943 | A1 | | 3/2006 | Ozaki et al. | |

FOREIGN PATENT DOCUMENTS

| | | |
|---|---|---|
| EP | 1 568 322 A1 | 8/2005 |
| JP | 2004-180932 A | 7/2004 |
| JP | 2006-187499 A | 7/2006 |
| WO | 2004/049948 A1 | 6/2004 |

* cited by examiner

*Primary Examiner* — Allen C. Ho
(74) *Attorney, Agent, or Firm* — Sughrue Mion, PLLC

(57) ABSTRACT

Slice image groups of a first photographing opportunity and a second photographing opportunity are acquired. Three-dimensional tumor areas (lesion areas) are extracted from the slice image groups, and a slice image with maximum tumor area is determined as a reference slice image of each slice image group. Based on the reference slice images thus determined, slice images positioned at the same distance away from the reference slice images in the slice direction are respectively acquired from the slice image groups of a first photographing opportunity and a second photographing opportunity, and the acquired slice images are displayed on a monitor device so that images can be compared and interpreted. Thus, an image interpreter can accurately compare and interpret images of lesion areas included in slice image groups with different photographing opportunities.

7 Claims, 11 Drawing Sheets

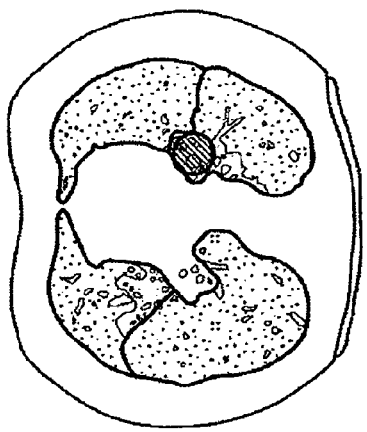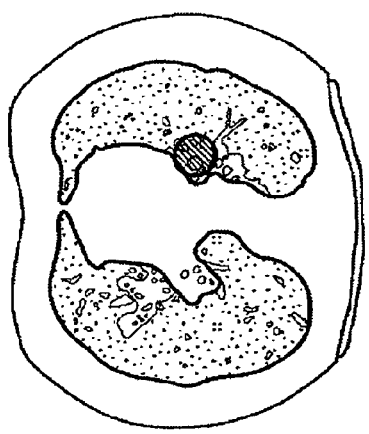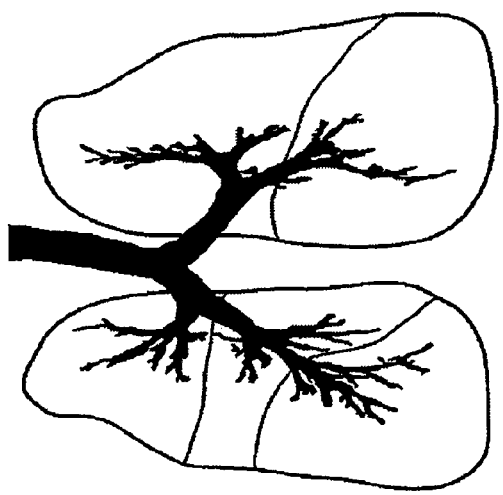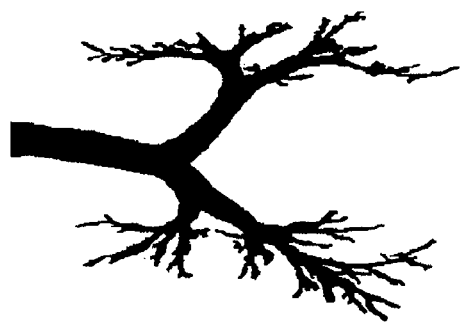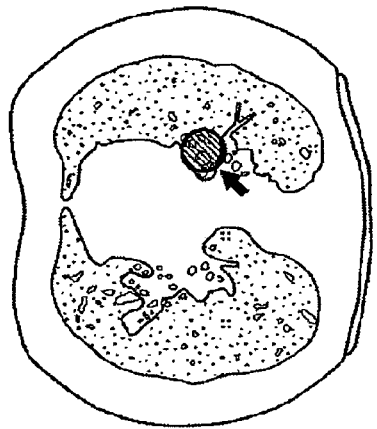

IMAGE DIAGNOSIS SUPPORTING APPARATUS, METHOD AND PROGRAM, AND RECORDING MEDIUM THEREOF

BACKGROUND OF THE INVENTION

1. Field of the Invention

The present invention relates to an image diagnosis supporting apparatus, a method and a program, and recording medium thereof. More particularly, the present invention relates to a technique suitable for comparing and interpreting slice image groups with different photographing opportunities or modalities.

2. Description of the Related Art

Conventionally, a computer-aided diagnosis apparatus has been proposed in which an image including a possible lesion obtained by a first modality and an image including a possible lesion obtained from a second modality different from the first modality are compared each other, the possible lesions included in the images are identified, the images including the possible lesions are displayed side by side, and the identified possible lesions are displayed so that the possible lesions can be mutually specified (Japanese Patent Application Laid-Open No. 2004-180932).

A computer-aided image diagnosis system has also been proposed in which a reference slice image (for example, a slice image at the end of the lung field) is set from a slice image group of photographs of the lung field at a first photographing opportunity, a slice image at the same slice position as the reference slice image (position at the end of the lung field) from a slice image group at a second photographing opportunity different from the first photographing opportunity is set as a reference slice image, and slice images that are the same distance away from the reference slice images are respectively selected from the slice image group at the first photographing opportunity and the slice image group at the second photographing opportunity, thereby enabling to compare the slice images (Japanese Patent Application Laid-Open No. 2006-187499).

SUMMARY OF THE INVENTION

However, although the invention described in Japanese Patent Application Laid-Open No. 2004-180932 enables to display and compare the same possible lesion (identified possible lesion) from images including the possible lesions obtained from different modalities, the invention does not match the slice positions of the slice image groups obtained from different modalities.

Furthermore, in the invention described in Japanese Patent Application Laid-Open No. 2006-187499, even though the reference slice image of the slice image group at the first photographing opportunity and the reference slice image of the slice image group at the second photographing opportunity are slice images of the same region, slice images that are the same distance away from these slice images may not be slice images of the same region due to respiration during photographing or other reasons. Especially when interpreting images of a tumor, the slice images in which the tumor exists may be mismatched.

The present invention has been made in view of the foregoing circumstances, and an object of the present invention is to provide an image diagnosis supporting apparatus, a method, a program and a recording medium thereof, and a recording medium thereof capable of accurately comparing and interpreting images of lesion areas included in slice image groups at different photographing opportunities or with different modalities.

In order to attain the object, according to a first aspect of the present invention, an image diagnosis supporting apparatus comprises: a slice image group acquisition device which acquires a first slice image group and a second slice image group with different photographing opportunities or modalities; a lesion area extraction device which extracts a first lesion area from the first slice image group and extracts a second lesion area corresponding to the first lesion area from the second slice image group; a reference slice image determination device which determines a first reference slice image of the first slice image group based on the extracted first lesion area and which determines a second reference slice image of the second slice image group based on the extracted second lesion area; a slice image selection device which selects slice images for comparative image interpretation from each of the first slice image group and the second slice image group, the slice images being the same distance away from the determined first reference slice image and the second reference slice image respectively; and an output device which outputs the selected slice images on a display device so that the images can be compared and interpreted.

Thus, the first reference slice image and the second reference slice image are determined based on the first lesion area and the second lesion area extracted respectively from the first slice image group and the second slice image group with different photographing opportunities or modalities, and the slice images that are the same distance away from the first reference slice image and the second reference slice image are selected to output the slice images to the display device so that the images can be compared and interpreted. From the perspective of comparing and interpreting images of the lesion areas, the positions of the slice images with different photographing opportunities and modalities can be effectively matched because the reference slice images are determined based on the lesion areas. Examples of the lesion areas include candidate regions such as brain tumor, chest nodules, liver tumor, liver cyst, and renal cyst.

According to a second aspect of the present invention, in the image diagnosis supporting apparatus according to the first aspect, the lesion area extraction device includes: an automatic extraction device which analyzes the acquired first slice image group and the second slice image group and automatically extracts the first lesion area and the second lesion area included in each slice image; and a contour information acquisition device which acquires contour information of the extracted first lesion area and the second lesion area.

According to a third aspect of the present invention, in the image diagnosis supporting apparatus according to the first aspect, the lesion area extraction device includes: a display device which displays at least one slice image of each of the acquired first slice image group and the second slice image group; a specification device which specifies seed points of the first lesion area and the second lesion area on the slice images displayed on the display device; an extraction device which extracts the first lesion area and the second lesion area based on the specified seed points; and a contour information acquisition device which acquires contour information of the extracted first lesion area and the second lesion area.

The extraction result of the lesion areas obtained by the lesion area extraction device can be recorded in association with the slice image groups so that the recorded extraction result can be used in the next comparative image interpreting.

According to a fourth aspect of the present invention, in the image diagnosis supporting apparatus according to any of the first to third aspects, the reference slice image determination device determines a slice image containing a maximum lesion area in the first slice image group including the extracted first lesion area as the first reference slice image and determines a slice image containing a maximum lesion area in the second slice image group including the extracted second lesion area as the second reference slice image.

According to a fifth aspect of the present invention, in the image diagnosis supporting apparatus according to any of the first to third aspects, the reference slice image determination device determines a slice image at a position distant by a length obtained by multiplying a length in a slice direction of the first lesion area by a predetermined coefficient in the range of 0 to 1 from one end in the slice direction of the extracted first lesion area as the first reference slice image and determines a slice image at a position distant by a length obtained by multiplying a length in a slice direction of the second lesion area by the predetermined coefficient in the range of 0 to 1 from one end in the slice direction of the extracted second lesion area as the second reference slice image.

When the predetermined coefficient is 0.5, slice images at the center positions of the lengths in the slice direction of the lesion areas are determined as the reference slice images.

According to a sixth aspect of the present invention, an image diagnosis supporting method comprises: acquiring a first slice image group and a second slice image group with different photographing opportunities or modalities; extracting a first lesion area from the first slice image group and extracting a second lesion area corresponding to the first lesion area from the second slice image group; determining a first reference slice image of the first slice image group based on the extracted first lesion area and determining a second reference slice image of the second slice image group based on the extracted second lesion area; selecting slice images for comparative image interpretation from each of the first slice image group and the second slice image group, the slice images being the same distance away from the determined first reference slice image and the second reference slice image respectively; and causing to display the selected slice images on a display device so that the images can be compared and interpreted.

According to a seventh aspect of the present invention, an image diagnosis supporting program causes a computer to realize functions of: acquiring a first slice image group and a second slice image group with different photographing opportunities or modalities; extracting a first lesion area from the first slice image group and extracting a second lesion area corresponding to the first lesion area from the second slice image group; determining a first reference slice image of the first slice image group based on the extracted first lesion area and determining a second reference slice image of the second slice image group based on the extracted second lesion area; selecting slice images for comparative image interpretation from each of the first slice image group and the second slice image group, the slice images being the same distance away from the determined first reference slice image and the second reference slice image respectively; and causing to display the selected slice images on a display device so that the images can be compared and interpreted.

According to an eighth aspect of the present invention, the image diagnosis supporting program according to the seventh aspect is recorded on a recording medium.

According to the present invention, the reference slice images are determined based on the lesion areas included in the slice image groups with different photographing opportunities or modalities, and the slice images that are the same distance away from the reference slice images are selected from the slice image groups so that the images can be compared and interpreted. As a result, from the perspective of comparative image interpreting of the lesion areas, excellent slice images can be presented.

BRIEF DESCRIPTION OF THE DRAWINGS

FIGS. 9A, 9B, 9C, 9D, and 9E are views used for describing an analysis method of an anatomical location of a chest image;

DETAILED DESCRIPTION OF THE PREFERRED EMBODIMENTS

A preferred embodiment of an image diagnosis supporting apparatus, a method, and a program according to the present invention will now be described with reference to the appended drawings.

[Device Configuration]

Figure 1:
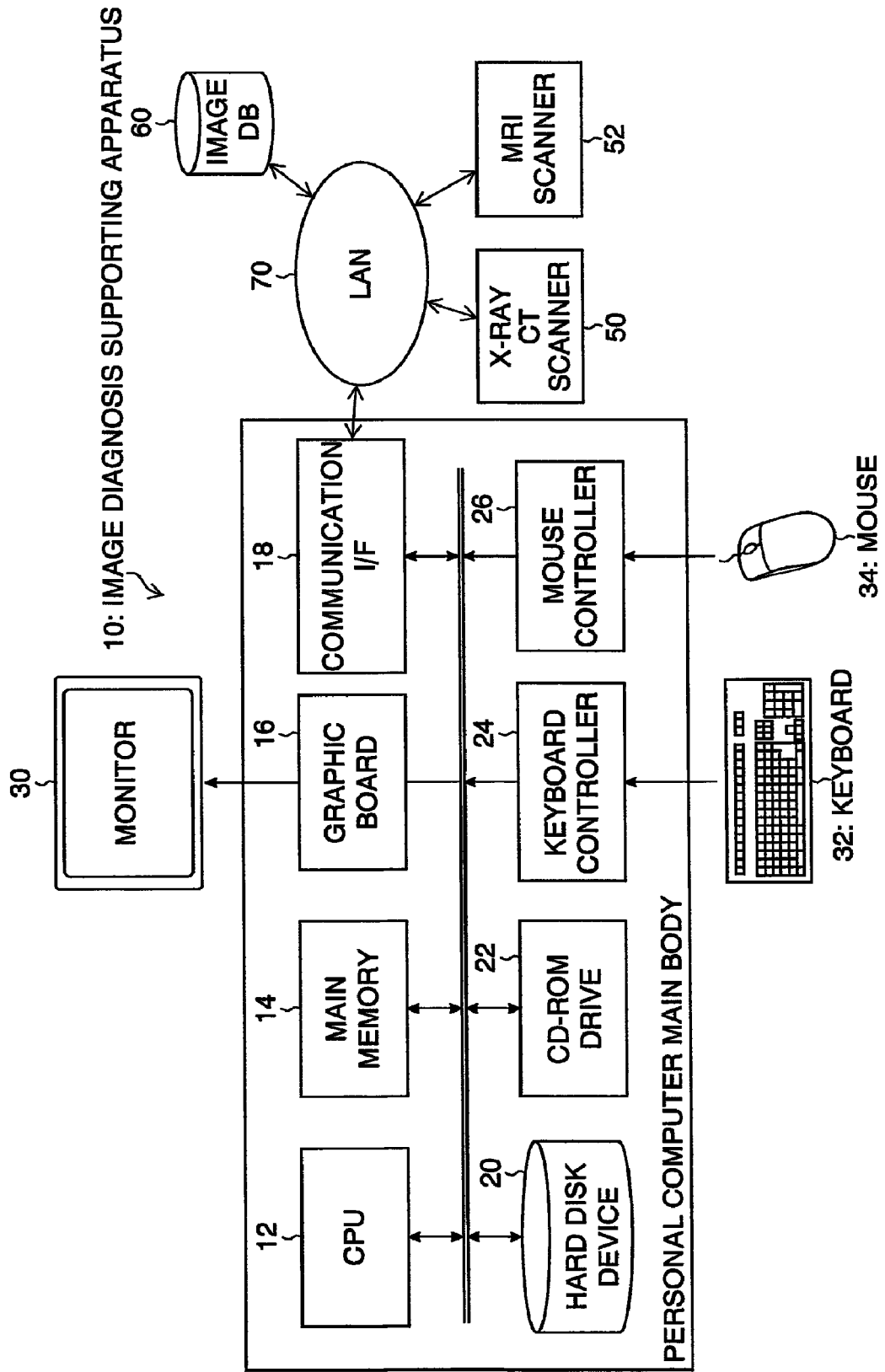
FIG. 1 is a system configuration diagram of an image diagnosis supporting network system including an image diagnosis supporting apparatus according to an embodiment of the present invention.

FIG. 1 is a system configuration diagram of an image diagnosis supporting network system including the image diagnosis supporting apparatus according to an embodiment of the present invention.

The image diagnosis supporting network system primarily comprises: an image diagnosis supporting apparatus 10 operated by an image interpreting physician, a clinician, or the like; an X-ray CT scanner 50; an MRI scanner 52; and image database (image DB) 60; and a network 70, such as an in-hospital LAN, that connects these components.

The image diagnosis supporting apparatus 10 is configured using a personal computer and primarily includes: a central processing unit (CPU) 12 that controls operations of the constituent elements; a main memory 14 that stores a control program of the apparatus and that serves as a work during execution of the program; a graphic board 16 that controls display of a monitor device 30 such as a liquid crystal display and a CRT display; a communication interface (communication I/F) 18 connected to the network 70; a hard disk device 20 storing various application software including an operation system (OS) of the personal computer, a device driver of a peripheral device connected to the personal computer, an image diagnosis supporting program of the present invention, and the like; a CD-ROM drive 22; a keyboard controller 24 that detects a key operation of a keyboard 32 and that outputs the key operation to the CPU 12 as an instruction input; and a mouse controller 26 that detects the state of a mouse 34 serving as a position input device and that outputs signals indicative of the position of the mouse pointer on the monitor device 30, the state of the mouse 34, and the like to the CPU 12.

The personal computer having the above configuration is well known except the image diagnosis supporting program of the present invention stored in the hard disk device 20. Therefore, detailed description of the constituent elements will be omitted.

Figure 2:
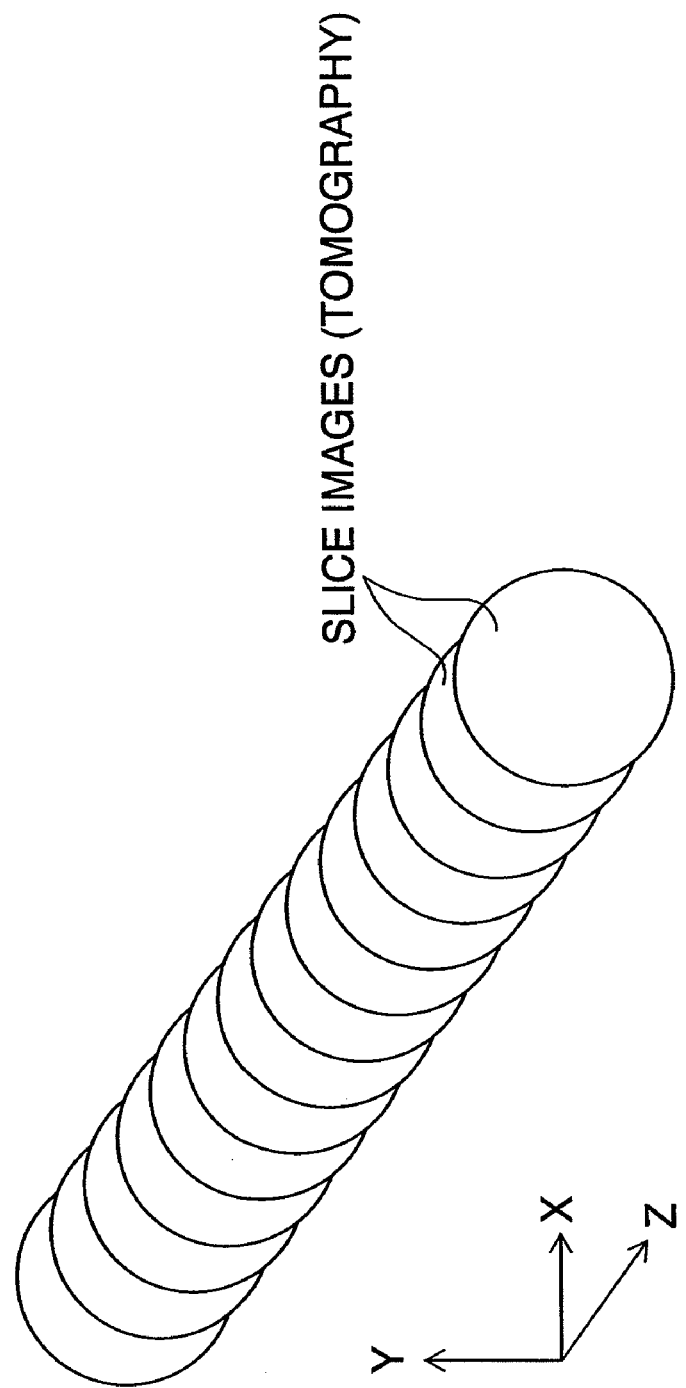
FIG. 2 is a view used for describing a slice image group.

Each of the X-ray CT scanner 50 and the MRI scanner 52 photographs a multiplicity of consecutive slice images along the z-axis direction (body axis direction of subject) as shown in FIG. 2. Slice image groups photographed by the X-ray CT scanner 50 and the MRI scanner 52 are stored in the image DB 60.

The image DB 60 stores and manages the slice image groups photographed by various modalities in association with patient, photographing date and time, photographed region, and type of modality such as the X-ray CT scanner 50 and the MRI scanner 52.

An image interpreting physician or a clinician operates the image diagnosis supporting apparatus 10 to acquire slice image groups from the image DB 60 through the network 70 and to display desired slice images on the monitor device 30, which will be described below. The image interpreting physician or the clinician then interprets the images displayed on the monitor device 30 and creates an image interpretation report or a medical record.

[Image Diagnosis Supporting Method]

Figure 3:
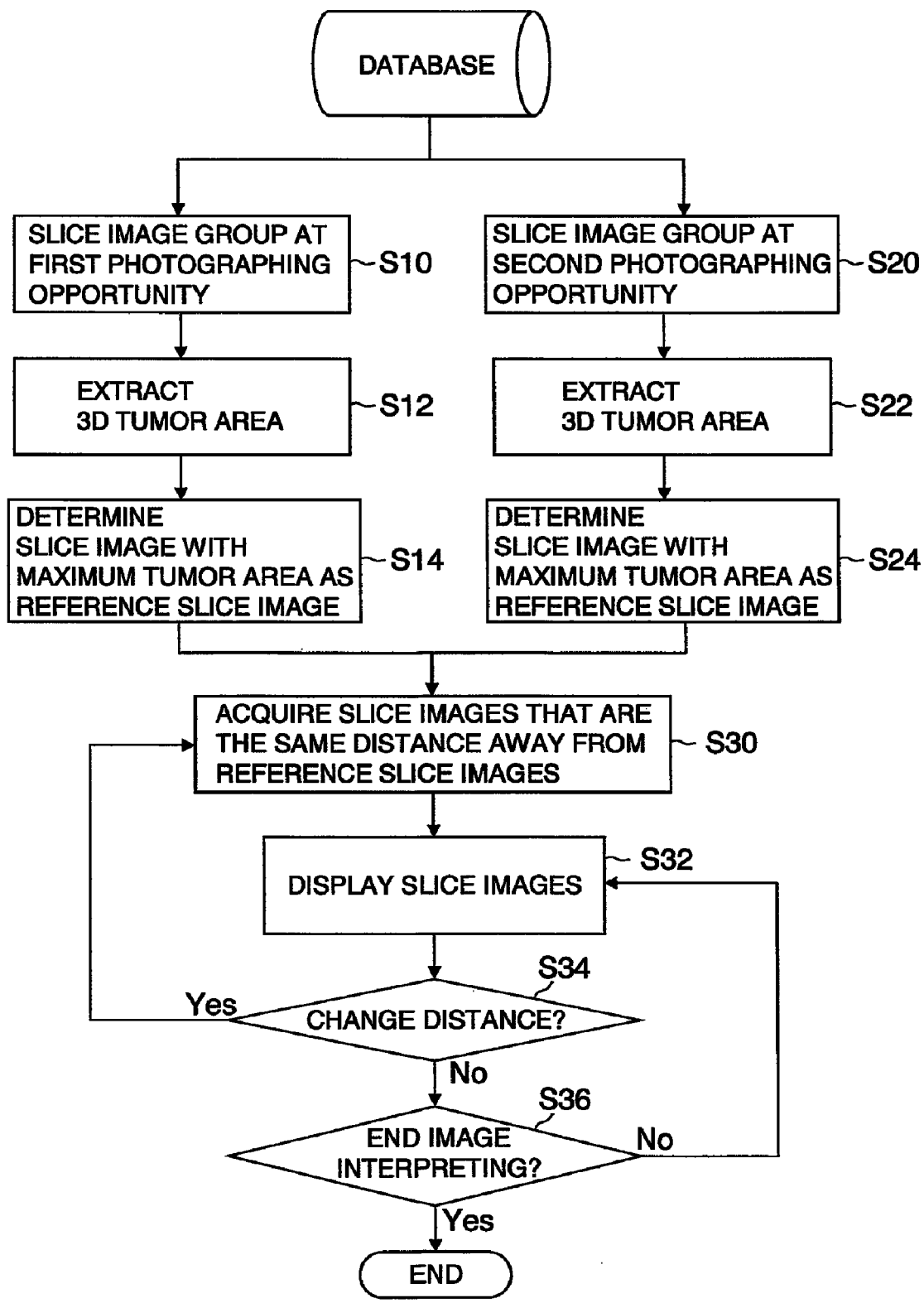
FIG. 3 is a flow chart showing procedures of an image diagnosis supporting method according to an embodiment of the present invention.

FIG. 3 is a flow chart showing procedures of the image diagnosis supporting method according to an embodiment of the present invention. The process is implemented by launching an image diagnosis supporting program.

The image interpreting physician operates the keyboard 32 and the mouse 34 of the image diagnosis supporting apparatus 10 and inputs patient name, photographing date and time, photographed region, type of 3D modality, and the like to acquire a desired slice image group (slice image group of a first photographing opportunity) from the image DB 60 based on the inputted information (step S110).

The image diagnosis supporting apparatus 10 semi-automatically or fully automatically extracts a lesion area (3D tumor area) from the acquired slice image group of the first photographing opportunity based on the image analysis by the image diagnosis supporting program (step S12).

An extraction method for semi-automatically extracting the lesion area will be described.

The image interpreting physician performs image diagnosis while looking at the slice images of the acquired slice image group sequentially displayed on the monitor device 30, and then selects a desired slice image (for example, a slice image with a relatively large lesion area).

Figure 4:
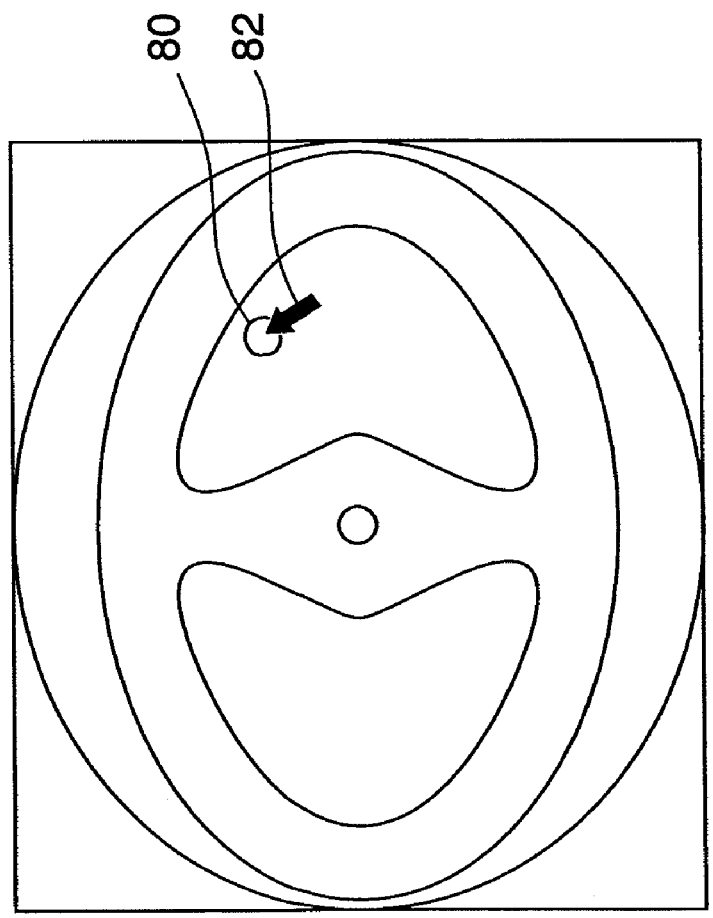
FIG. 4 is a view used for describing designation of a seed point when semi-automatically extracting a lesion area.

Subsequently, the image interpreting physician operates the mouse to move a cursor 82 to the center (seed point) of a lesion area 80 on the slice image displayed on the monitor device 30 as shown in FIG. 4 and then marks the seed point by one-click 3D measurement to semi-automatically extract the lesion area.

The one-click 3D measurement of the lesion area is performed as follows.

Figure 5A:
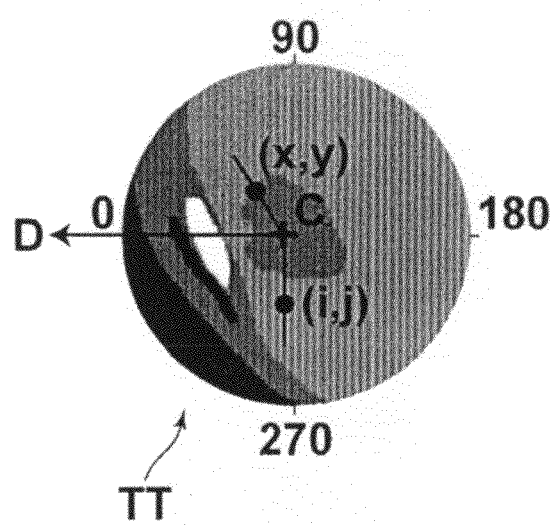
FIGS. 5A, 5B, 5C, and 5D are views used for describing an automatic extraction method of the lesion area.

As shown in FIG. 5A, a lesion area (tumor area) is first extracted, centering on an indicated point C. It is preferable to indicate the point C close to the center of the tumor area.

An area having a certain radius sufficiently including the tumor area is determined as a discrimination area TT.

Figure 5B:
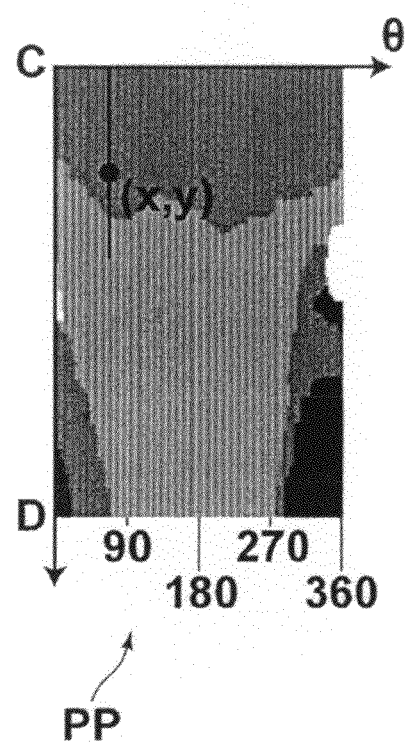

An image of the discrimination area TT as shown in FIG. 5A is then converted to a discrimination image PP developed on a polar coordinate plane indicated by a distance from the point C and an angle θ to a predetermined straight line passing through the point C. For example, a polar coordinate image of FIG. 5B is obtained by applying polar-coordinate conversion using a clockwise angle θ with respect to a radial line segment CD of the image shown in FIG. 5A, and the obtained polar coordinate image is used to determine whether the pixels in the discrimination area is a contour of the tumor area.

Evaluation values for determining whether each pixel (x, y) in the discrimination area is a pixel indicative of the contour are calculated based on a feature quantity extracted from luminance information in one-dimensional luminance profile on a straight line passing through each pixel (x, y) and the point C in the discrimination area.

Figure 5C:
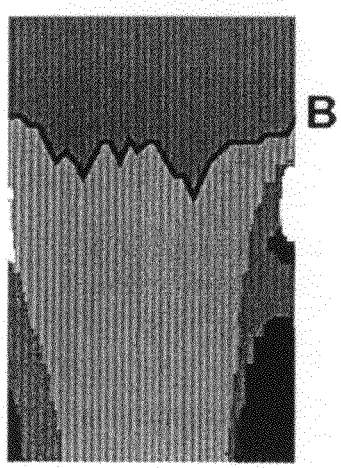
Figure 5D:
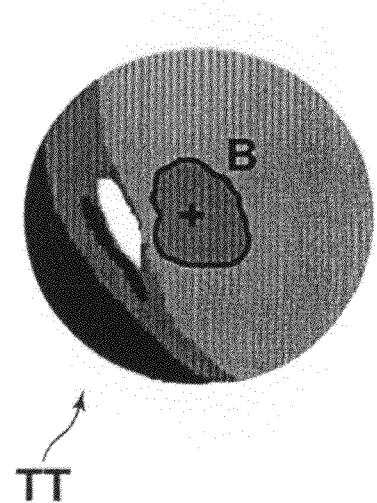

The luminance value of the one-dimensional luminance profile on the straight line passing through each pixel (x, y) and the point C dramatically changes around the contour of the tumor area. Thus, the feature quantity is calculated from the luminance values to generate a discriminator using the feature quantity. An image (x, y) constituting the contour as shown with a thick line B of FIG. 5C is obtained based on the result obtained from the discriminator. The discrimination image PP indicated with a polar coordinate system is then inverted to a normal coordinate system to determine the contour on the image of the discrimination area TT as shown in FIG. 5D. The area surrounded by the contour is extracted as a tumor area (i.e., lesion area).

The lesion area may be extracted using an area separation technology described in "Wormanns D, Kohl G, Klotz E, et al. Volu-metric measurements of pulmonary nodules at multi-row detector CT: in vivo reproducibility. Eur Radiol 2004; 14(1): 86-92", or in other documents.

The lesion area is extracted throughout the consecutive slice images to acquire three-dimensional contour information of the lesion area.

In addition, to automatically extract the lesion area, the slice images are analyzed, and the features of the area of interest are analyzed.

If the area of interest is an abnormal shadow such as a tumor or lung nodules appeared in the lung field, the abnormal shadow appears distinctive in shape, size, and density at the peripheral part or in the area. The anatomical location where the abnormal shadows have shown up is also considered a feature of the abnormal shadows. Thus, the area of interest is analyzed to obtain features of shape, features of size, features of density in the area of interest, features of density of the peripheral part of the area of interest, the anatomical location, and the like.

(1) Features of Shape

Figure 6:
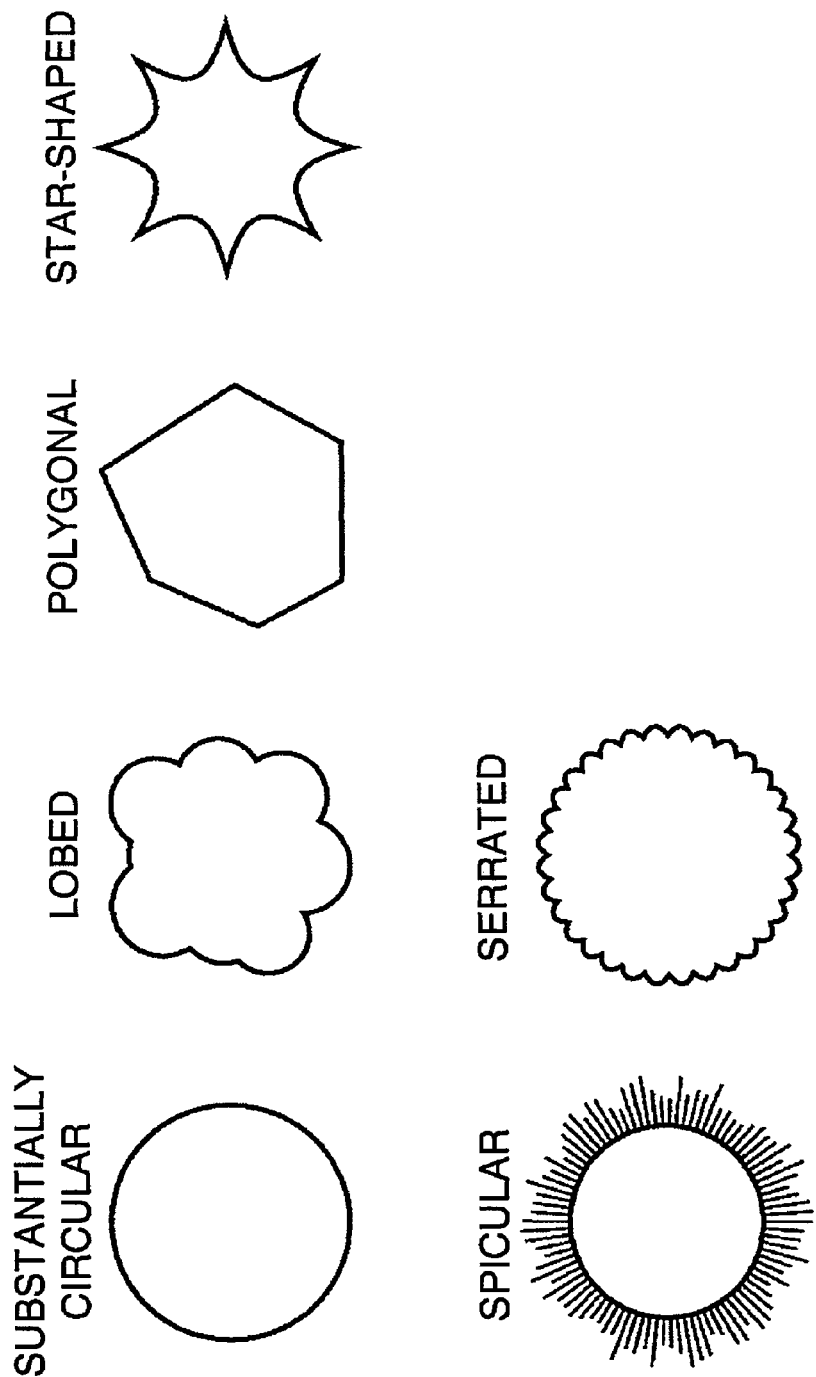
FIG. 6 depicts examples of classification of shapes of the lesion area.

The shape of an abnormal shadow is classified into substantially circular, lobed, polygonal, star-shaped, spicular, serrated, and irregularly-shaped, as shown in FIG. 6 (for details, see, for example, "Iwano, et al, Benign/Malignant Computer-Aided Diagnosis of Solitary Lung Nodules, JRC 2006").

These shapes can be classified using the circularity (ratio between the circumference and the area) and the second centroid moment (obtained by normalizing the sum of the squares of a distance between the nodule centroid and each pixel in nodule by the square of the area).

Figure 7:
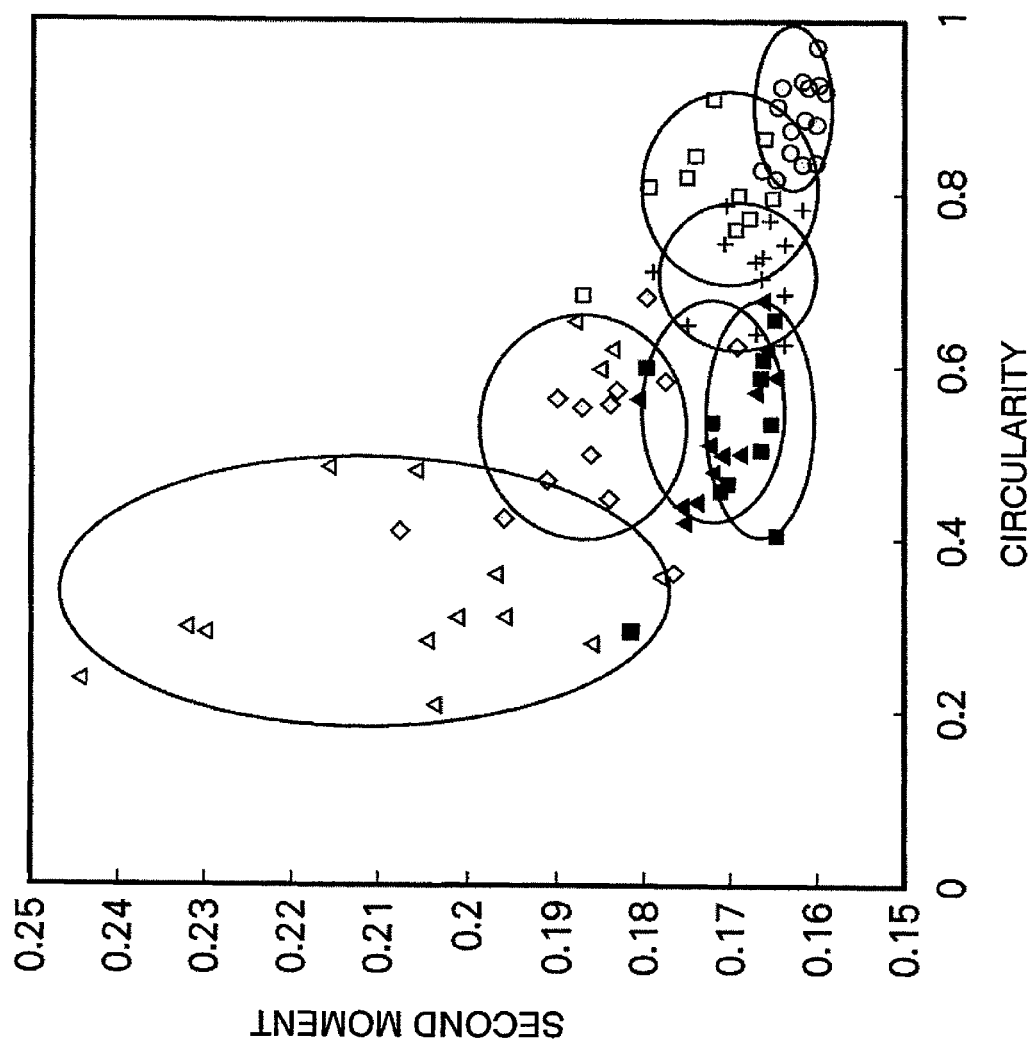
FIG. 7 depicts a classification of shapes of abnormal shadows and a relationship between the second moment and the circularity.

The circularity and the second moment show the distribution as shown in FIG. 7, and the ranges enclosed by ellipses are classified into substantially circular, lobed, polygonal, star-shaped, spicular, serrated, and irregularly-shaped (shape that does not belong to any of the above). Using an existing nonlinearity discrimination method or a design discrimination method to input the feature quantity such as the circularity and the second moment enables to realize a discriminator that outputs results indicating what kind of shapes are formed.

(2) Features of Size

The size of an abnormal shadow is shown with area, volume, major and minor axis diameters, and the like, which can be automatically measured from the extracted area of interest.

(3) Features of Density in the Area of Interest

An abnormal shadow is classified into Pure GGO (ground-glass opacity), Mixed GGO (ground-glass opacity and high density), and Solid (high density), depending on the density. The density can be discriminated by an existing nonlinearity discrimination method or a design discrimination method using average value, deviation, maximum value, and minimum value in the area of interest extracted by the extraction device as the feature quantity.

The abnormal shadow can also be classified depending on the existence of calcification or the existence of cavity in the area, based on the density values. It is determined that the calcification exists if the maximum value of the density in the area of interest is greater than a certain threshold (for example, reference CT value 500). It is determined that the cavity exists if the minimum value of the density in the area of interest is less than a certain threshold (for example, reference CT value −500).

(4) Features of Density of the Peripheral Part of the Area of Interest

Figure 8B:
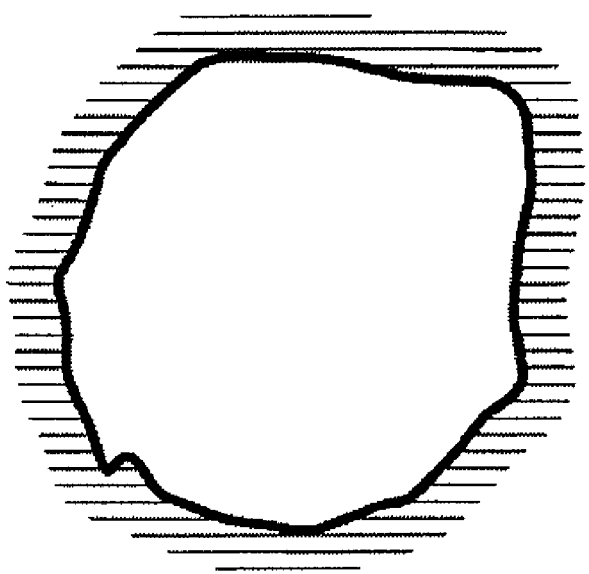
FIG. 8B depicts a peripheral area of the area of interest shown in FIG. 8A.
Figure 8A:
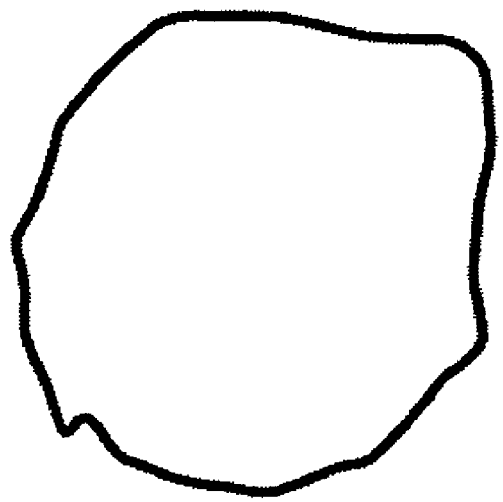
FIG. 8A depicts an area of interest.

The peripheral part of the abnormal shadow can be classified into clear and unclear. Whether the peripheral part is clear or unclear is determined using the density difference between inside and outside of the contour of the area of interest extracted by an analysis program. The density difference is obtained by the following formula based on the density values of the internal area (inside the contour) and the periphery (shaded portion outside the contour shown in FIG. 8B) of the area of interest having a contour shown with a thick line in FIG. 8A.

Density difference=[average value of density value (periphery)−average value (internal)]/[variance (periphery)+variance (internal)].

(5) Anatomical Location

The anatomical location of the area of interest is then recognized. For example, in a chest image, as shown in FIG. 9, automatic extractions of the lung field (see FIG. 9B) and bronchi (FIG. 9D) are first performed from an inputted chest image (see FIG. 9A). Interlobar fissures are then extracted (see FIGS. 9C and 9E) from the shape of the bronchi to perform the lobe classification dividing the lung field (upper right, middle, lower lobes and upper left, lower lobes) (for details, see, for example, document 1 "Tatsuro Hayashi, Xiangron Zhou, Takeshi Hara, Hiroshi Fujita, Ryujiro Yokoyama, Takuji Kiryu, Hiroaki Hoshi: Development of the Procedure for Automatic Extraction of Interlobar Fissures and its Performance Evaluation in Chest Multi-slice CT image, The Institute of Electronics, Information and Communication Engineers Technical Research Report, MI2003-53, 39-44 (2003)", document 2 "Nakata, et al., Study on Lobe Classification of Bronchi Extracted from Three-dimensional Chest CT Image, 15th Computer Aided Diagnosis of Medical Images, pp 275-276, 2005. 11", document 3 "Tanaka, et al., Automatic Classification of Pulmonary Artery and Pulmonary Vein from Chest X-ray CT Image Based on Spatial Arrangements of Blood Vessels and Bronchi, The Institute of Electronics, Information and Communication Engineers Journal, DII, Vol. J88, pp 1421-1431, 2005. 4", and document 4": Shyu C, Brodley C E, Kak A, Kosaka A, Aisen A, Broderick L. ASSERT, a physician-in-the-loop content-based image retrieval system for HRCT image databases. Computer Vision and Image Understanding, 1999; 74:111-132"). For example, the anatomical location of the area of interest shown in FIG. 9A (part pointed with a black arrow) is recognized as "left lung, upper lobe,".

In this way, the feature quantity of the area of interest in the slice images is obtained to determine whether the area of interest is a lesion area. The lesion area is then extracted throughout the consecutive slice images in the same way as described above to acquire 3D contour information of the lesion area (3D tumor area).

Returning to FIG. 3, after acquiring the 3D contour information of the lesion area, the slice image having a maximum lesion area is obtained from the slice image group of the first photographing opportunity using the image diagnosis supporting program. The contour of the lesion area is obtained from each slice image. Therefore, calculating the number of pixels in the contour enables to obtain the dimension of the lesion area included in each slice image.

Figure 10A:
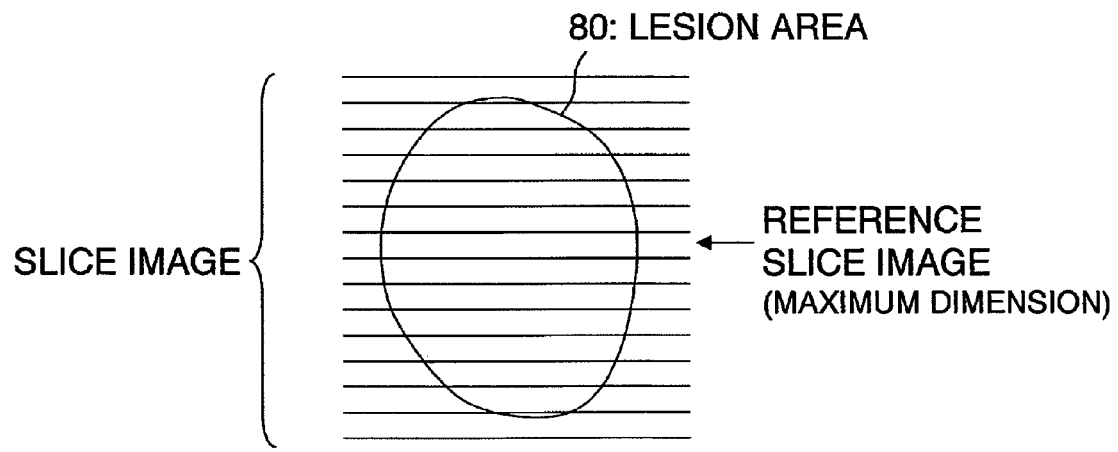
FIGS. 10A and 10B are views used for describing a determination method of a reference slice image.

As shown in FIG. 10A, the slice image with a maximum lesion area is determined as a reference slice image (step S14).

Figure 10B:
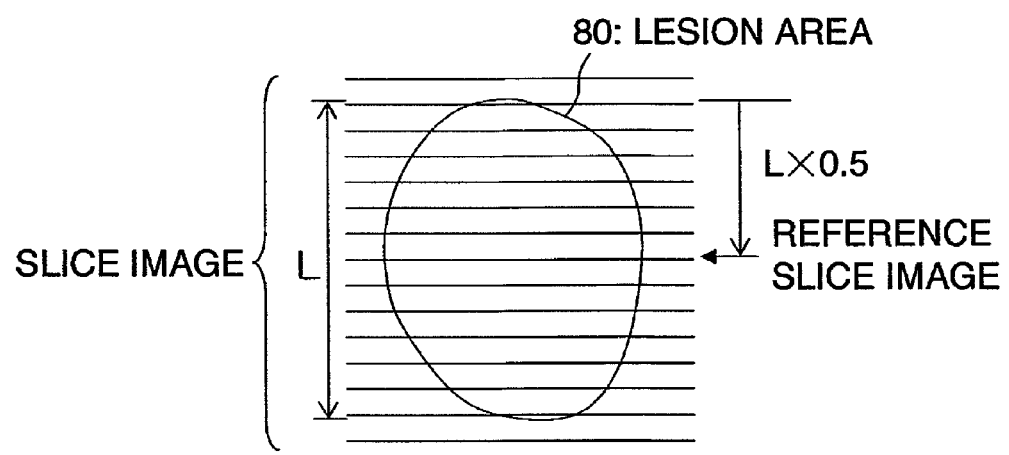

The method for determining the reference slice image is not limited to the method described above. As shown in FIG. 10B, the reference slice image may be determined by obtaining a length L in the slice direction of the lesion area 80 and multiplying the length L by a predetermined coefficient (0.5 in the example of FIG. 10) in the range of 0 to 1, and the slice image at the position 0.5 L away from the one end (upper end in FIG. 10) of the lesion area 80 is determined as the reference slice image.

The image interpreting physician then operates the image diagnosis supporting apparatus 10 to acquire a slice image group of a second photographing opportunity different from the first photographing opportunity from the image DB 60 (step S20). It is obvious that the slice image group of the same patient and the same photographed region as those in the slice image group of the first photographing opportunity is obtained.

Subsequently, a 3D tumor area is extracted from the slice image group of the second photographing opportunity in the same way as the method of extracting the 3D tumor area (lesion area) from the slice image group of the first photographing opportunity (step S22). A slice image with a maximum lesion area is obtained from the slice image group of the second photographing opportunity based on contour information of the extracted 3D tumor area, and the slice image is determined as a reference slice image of the slice image group of the second photographing opportunity (step S24).

Once the reference slice image of the slice image group of the first photographing opportunity and the reference slice image of the slice image group of the second photographing opportunity are determined, slice images that are the same distance away from the reference slice images in the slice direction are respectively acquired from the slice image group of the first photographing opportunity and the slice image group of the second photographing opportunity (step S30). Setting up the initial value of the same distance to 0 enables to acquire the reference slice image of the slice image group of the first photographing opportunity and the reference slice image of the slice image group of the second photographing opportunity.

Figure 11:
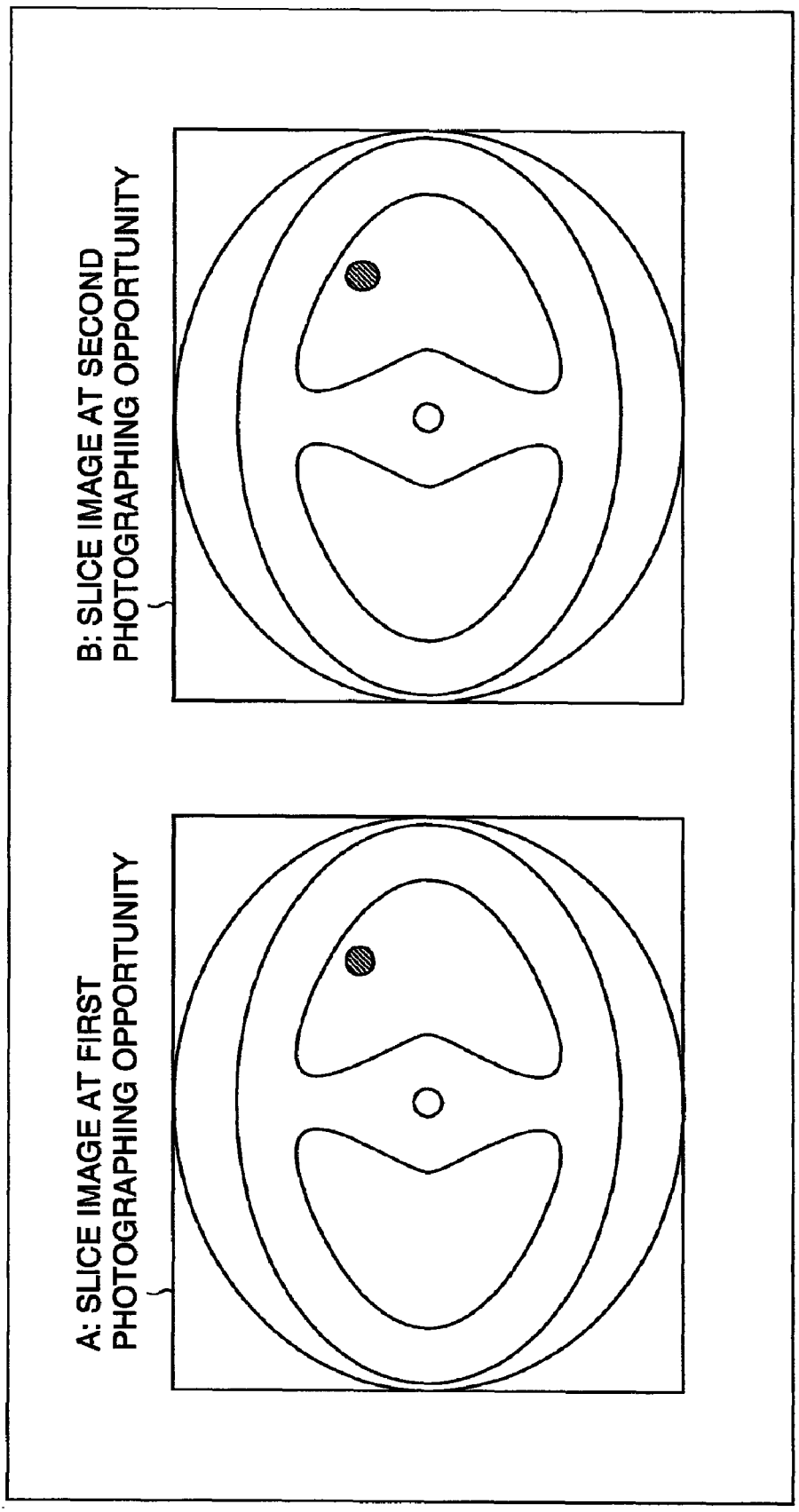
FIG. 11 is a conceptual view of a monitor screen during comparative image interpreting of a slice image.

The image diagnosis supporting program causes the monitor device 30 to display the slice images, which are acquired in step S30, side by side. FIG. 11 is a conceptual view of a monitor screen displaying a slice image A of the first photographing opportunity and a slice image B of the second photographing opportunity arranged side by side so that the images can be compared and interpreted.

The image interpreting physician can easily recognize the change in size, shape, or density of the lesion area by comparing and interpreting the slice image A and the slice image B.

The image interpreting physician can also operate the keyboard 32 and the mouse 34 to instruct (for example, instruction by rotating the mouse wheel forward or backward, or by operating the up and down keys or other keys of the keyboard 32 to switch the screen) to change a distance from the reference slice images. Once the distance from the reference slice images is changed based on the instruction (step S34), the process returns to step S30, and slice images positioned at a changed distance away from the reference slice images are respectively acquired from the slice image group of the first photographing opportunity and the slice image group of the second photographing opportunity.

As a result, the image interpreting physician can compare and interpret the slice image positioned at an arbitrary distance away from the reference slice image of the slice image group of the first photographing opportunity and the slice image positioned at the same arbitrary distance away from the reference slice image of the slice image group of the second photographing opportunity.

Once the image interpreting physician inputs an instruction to end the image interpreting, the process of the present image diagnosis support is terminated (step S36).

Modified Examples

In the embodiment, the slice images for comparative image interpretation are selected for display from the slice image groups at the first photographing opportunity and the second photographing opportunity different from the first photographing opportunity. This arrangement is, however, not restricted, and the present invention can also be applied to a case in which slice images for comparative image interpretation are selected for display from slice image groups acquired by different types of 3D modalities (X-ray CT scanner 50, MRI scanner 52, Positron Emission Tomography (PET device) not shown, or Single Photon Emission Computed Tomography (SPECT device) not shown). There may also be three or more slice image groups for comparing and interpreting images.

In addition, the method for determining the reference slice images based on the contour information of the lesion area is not limited to the embodiment. For example, the centroid location of the lesion area may be measured to determine slice images closest to the centroid location as the reference slice images.

The slice image groups may not only be acquired from the in-hospital image DB 60 through the network 70 such as an in-hospital LAN, but may be acquired from an external image DB through a secure external network such as IPSec and SSL-VPN.

What is claimed is:

1. An image diagnosis supporting apparatus comprising:
a slice image group acquisition device which acquires a first slice image group and a second slice image group with different photographing opportunities or modalities;
a lesion area extraction device which extracts a first lesion area from the first slice image group and extracts a second lesion area corresponding to the first lesion area from the second slice image group;
a reference slice image determination device which determines a first reference slice image of the first slice image group based on the extracted first lesion area and determines a second reference slice image of the second slice image group based on the extracted second lesion area;
a slice image selection device which selects slice images for comparative image interpretation from each of the first slice image group and the second slice image group, the slice images being the same distance away from the determined first reference slice image and the second reference slice image respectively; and
an output device which outputs the selected slice images so that the slice images can be compared and interpreted.

2. The image diagnosis supporting apparatus according to claim 1, wherein
the lesion area extraction device includes:
an automatic extraction device which analyzes the acquired first slice image group and the second slice image group and automatically extracts the first lesion area and the second lesion area included in each slice image; and
a contour information acquisition device which acquires contour information of the extracted first lesion area and the second lesion area.

3. The image diagnosis supporting apparatus according to claim 1, wherein
the lesion area extraction device includes:
a display device which displays at least one slice image of each of the acquired first slice image group and the second slice image group;
a specification device which specifies seed points of the first lesion area and the second lesion area on the slice images displayed on the display device;
an extraction device which extracts the first lesion area and the second lesion area based on the specified seed points; and
a contour information acquisition device which acquires contour information of the extracted first lesion area and the second lesion area.

4. The image diagnosis supporting apparatus according to claim 1, wherein
the reference slice image determination device determines a slice image containing a maximum lesion area in the first slice image group including the extracted first lesion area as the first reference slice image and determines a slice image containing a maximum lesion area in the second slice image group including the extracted second lesion area as the second reference slice image.

5. The image diagnosis supporting apparatus according to claim 1, wherein
the reference slice image determination device determines a slice image at a position distant by a length obtained by multiplying a length in a slice direction of the first lesion area by a predetermined coefficient in the range of 0 to 1 from one end in the slice direction of the extracted first lesion area as the first reference slice image and determines a slice image at a position distant by a length obtained by multiplying a length in a slice direction of the second lesion area by the predetermined coefficient in the range of 0 to 1 from one end in the slice direction of the extracted second lesion area as the second reference slice image.

6. An image diagnosis supporting method for support an image diagnosis using a computer to perform:

acquiring a first slice image group and a second slice image group with different photographing opportunities or modalities;

extracting a first lesion area from the first slice image group and extracting a second lesion area corresponding to the first lesion area from the second slice image group;

determining a first reference slice image of the first slice image group based on the extracted first lesion area and determining a second reference slice image of the second slice image group based on the extracted second lesion area;

selecting slice images for comparative image interpretation from each of the first slice image group and the second slice image group, the slice images being the same distance away from the determined first reference slice image and the second reference slice image respectively; and causing to display the selected slice images on a display device so that the slice images can be compared and interpreted.

7. A non-transitory recording medium on which an image diagnosis supporting program is recorded, the image diagnosis supporting program causing a computer to realize functions of:

acquiring a first slice image group and a second slice image group with different photographing opportunities or modalities;

extracting a first lesion area from the first slice image group and extracting a second lesion area corresponding to the first lesion area from the second slice image group;

determining a first reference slice image of the first slice image group based on the extracted first lesion area and determining a second reference slice image of the second slice image group based on the extracted second lesion area;

selecting slice images for comparative image interpretation from each of the first slice image group and the second slice image group, the slice images being the same distance away from the determined first reference slice image and the second reference slice image respectively; and causing to display the selected slice images on a display device so that the slice images can be compared and interpreted.

* * * * *